US011903378B2

(12) United States Patent
McMenamy et al.

(10) Patent No.: US 11,903,378 B2
(45) Date of Patent: Feb. 20, 2024

(54) METHOD OF MAPPING DROPLET SIZE OF AGRICULTURAL SPRAYERS

(71) Applicant: Precision Planting LLC, Tremont, IL (US)

(72) Inventors: Justin McMenamy, Edwards, IL (US); Ben Schlipf, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 877 days.

(21) Appl. No.: 16/965,257

(22) PCT Filed: Jan. 28, 2019

(86) PCT No.: PCT/US2019/015476
§ 371 (c)(1),
(2) Date: Jul. 27, 2020

(87) PCT Pub. No.: WO2019/148138
PCT Pub. Date: Aug. 1, 2019

(65) Prior Publication Data

US 2021/0068384 A1 Mar. 11, 2021

Related U.S. Application Data

(60) Provisional application No. 62/622,792, filed on Jan. 26, 2018.

(51) Int. Cl.
*A01M 7/00* (2006.01)
*A01B 69/00* (2006.01)

(52) U.S. Cl.
CPC .......... *A01M 7/0089* (2013.01); *A01B 69/00* (2013.01)

(58) Field of Classification Search
None
See application file for complete search history.

(56) References Cited

U.S. PATENT DOCUMENTS

| | | | |
|---|---|---|---|
| 5,704,546 | A | 1/1998 | Henderson et al. |
| 2013/0105591 | A1 | 5/2013 | Peterson |
| 2015/0237795 | A1 | 8/2015 | Koch et al. |
| 2017/0318743 | A1 | 11/2017 | Sauder et al. |

OTHER PUBLICATIONS

European Patent Office, Search Report for related European Patent Application No. EP19743544.9, dated Sep. 21, 2021.
Precision Planting LLC, Control DownForce with Military Precision: Win the Battle for Higher Yields—DeltaForce Control Brochure; 2013; pp. 1-2.

(Continued)

*Primary Examiner* — Sean Shechtman

(57) ABSTRACT

A method of graphically mapping liquid product applied to a field by an agricultural sprayer having a plurality of spray nozzles. The method includes generating an application map on an aerial image of the field, the application map including a droplet size map displaying said droplet sizes being sprayed by each of the plurality of spray nozzles or a gang of spray nozzles as the agricultural sprayer traverses the field. The application map may also include an application rate map displaying said application rates being sprayed by each of the plurality of spray nozzles or the gang of spray nozzles as the agricultural sprayer traverses the field.

15 Claims, 12 Drawing Sheets

(56) References Cited

OTHER PUBLICATIONS

USPTO-PCT Receiving Office, International Search Report prepared for parent Application No. PCT/US2019/015476, dated Mar. 27, 2019.
Hipkins and Grisso, "Droplet Chart / Selection Guide", Publication 442-031, College of Agriculture and Life Sciences, Virginia Polytechnic Institute and State University, 2014.
Pesticide Stewardship, "Managing Drift with Nozzles and Boom Height" Published @ https://pesticidestewardship.org/pesticide-drift/managing-drift-with-nozzles-and-boom-height, viewed Sep. 27, 2017.
Pesticide Stewardship, "Understanding Droplet Size", found @ https://pesticidestewardship.org/pesticide-drift/understanding-droplet-size, viewed Sep. 27, 2017.

METHOD OF MAPPING DROPLET SIZE OF AGRICULTURAL SPRAYERS

BACKGROUND

Position-responsive control systems for agricultural sprayers which permit control of application rate and droplet size associated with prescription maps or spray zones of a field are known in the art. One such system is disclosed in U.S. Pat. No. 5,704,546 (hereafter "the '546 patent"), which is incorporated herein in its entirety by reference. As disclosed in the '546 patent, it is desirable to control application rates and droplet size to account for different soil types, crop conditions and density of weed or pest infestations which may vary across the field, while at the same time accounting for travel speed and environmental variables such wind speed, humidity and temperature, all of which can affect the uniformity and efficiency of the spray materials as applied to the intended soil or crop targets. Also as disclosed in the '546 patent, it is desirable to provide independent position-responsive control of individuals nozzles across the sprayer to regulate application rates and droplet size of individual nozzles to account for proximity to field boundaries and waterways which often have irregular boundaries and require different treatment to minimize spray drift or overspray.

While the position-responsive control system disclosed in the '546 patent may serve its intended purpose, the '546 patent does not disclose a system for creating a mapped record of the as-applied application rates or as-applied droplet size to the field. U.S. Pat. No. 5,884,205 (hereafter "the '205 patent"), incorporated herein in its entirety by reference, discloses a system for monitoring sections of the spray boom by providing a graphical representation on a display console which boom sections are "on" or "off" and to provide a map with an indication of what area of a surface was treated and with how much material, including monitoring the operation of the "fence row" nozzles with each fence row nozzle treated as a boom section. However, the '205 patent does not disclose mapping the as-applied application rate and droplet size of individual spray nozzles across the boom.

U.S. Patent Publication No. US2013/0105591 (hereafter "the '591 publication"), incorporated herein in its entirety by reference, discloses a system for controlling droplet size of the product applied to the field on a continuous or periodic basis based on weather and machine information. The '591 publication also discloses providing a real time graphical representation of a coverage map showing the area of the field covered with each pass of the sprayer and a graphical representation of the estimated drift plume of the sprayer based on weather and machine information. The '591 publication also discloses that the choice of optimal droplet size may be visually represented by changes on the display graphical representation of the drift plume, where the operator may obtain a visual confirmation of the appropriate droplet size by how it affects the drift plume. While the system disclosed in the '591 publication may serve its intended purposes, the '591 publication does not disclose mapping the as-applied application rate and droplet size of individual spray nozzles across the boom.

Applicant's previously owned U.S. application, U.S. Publication No. US2016/0183450, incorporated herein by reference in its entirety, and a commercial embodiment thereof marketed as FieldView®, previously available from Precision Planting LLC, 23207 Townline Road, Tremont, Illinois 61568, and now available from The Climate Corporation, discloses and provides a real-time, high definition seed planting map of each seed, seed skips, seed multiples and other operating and agronomic data which allows the operator to have complete real-time vision of the planter's operation and performance while planting and for later reference with other agricultural input maps and yield maps. No such system is available for sprayer operators and therefore there remains a need for a system for mapping as-applied application rates and droplet size of agricultural sprayers to allow the operator to have complete real-time vision of the sprayer's operation and performance while spraying and for later reference with other agricultural input and yield maps.

BRIEF DESCRIPTION OF THE DRAWINGS

FIG. 1 is a partial perspective view of an embodiment of an agricultural sprayer implement along with a schematic illustration of a monitor system and sprayer controller.

FIG. 1A is an enlarged partial perspective view of an embodiment of an agricultural sprayer implement showing a gang of nozzles connected to a single line or hose.

FIG. 2 is a more detailed schematic illustration of the embodiment of the monitor system of FIG. 1.

FIG. 3 illustrates an embodiment of a process for generating a droplet size map.

FIG. 4 illustrates an embodiment of the droplet size map generated by the process illustrated in FIG. 3.

FIG. 5 illustrates an embodiment of a product application rate map.

FIG. 6 illustrates an embodiment of a process for generating the product application rate map of FIG. 5.

FIG. 7 illustrates an embodiment of a process for setting up a monitor system and storing and mapping operational data.

FIG. 8 illustrates an embodiment of a map screen displaying a live spray map and a prior season spray map.

FIG. 9 illustrates an embodiment of a map screen displaying a live yield map and a completed spray map.

FIG. 10 illustrates an embodiment of a map screen displaying an application rate map and a live yield map.

FIG. 11 illustrates an embodiment of a map screen displaying a soil type map and a live yield map.

FIG. 12 illustrates an embodiment of a process for displaying agricultural data.

DESCRIPTION

Overview

Referring now to the drawings, wherein like reference numerals designate identical or corresponding parts throughout the several views, FIG. 1 illustrates an embodiment of a sprayer implement 10 along with a schematically illustrated monitor system 100 which is in data communication with the sprayer controller 200.

The sprayer implement 10 generally includes a holding tank 12 and a spray boom 14 extending transversely with respect to the direction of travel as indicated by arrow 16. The spray boom 14 may be adapted to raise and lower with respect to the soil surface, to adjust boom pitch, and may fold and/or retract when being transported between fields. The tank 12 holds the liquid product, such as pesticides, herbicides, fungicides, fertilizers and other chemical products, to be applied to the target soil or crop. As is known in the art, the implement 10 includes associated pumps, valves, manifolds, hoses or lines, actuators and pressure sensors (not shown) to cause the liquid product to be communicated from the holding tank 12 to the plurality of nozzles 20 supported by and spaced along the transverse length of the boom 14. The nozzles 20 deliver the liquid product to the target soil or crop as the sprayer implement traverses the field. The nozzles 20 are configured with orifices to create different spray patterns and droplet sizes. Additionally, as is well known in the art, the nozzles may be capable of automatic adjustment (via the controller 200 discussed below) to modify the droplet size by controlling the fluid pressure at the nozzle and/or the nozzles may be configured with mechanically or electrically actuated actuators which enable selection of different nozzle spray patterns and droplet sizes based on command signals generated by the controller 200.

The controller 200 controls the operation of the sprayer implement 10. As is known in the art, the controller 200 communicates command signals for actuation or control over the spray implement's various controllable devices, including the actuators, nozzle actuators, valves and/or valve actuators, solenoids, pumps, meters, boom height controls, boom pitch controls, boom section controls, etc. The controller 200 may be coupled to various sensors such as pump sensors, flow rate sensors, pressure sensors, boom height or boom pitch sensors, which provide machine operating parameters for control over the respective components. The controller 200 may be coupled to environmental sensors that detect weather conditions, such as wind speed, wind direction, ambient temperature, barometric pressure, humidity, etc. The weather information may be used to control boom height, flow rate, and droplet size to minimize spray drift. Alternatively, or in addition, the environmental sensors may be omitted and weather information received by the controller 200 and/or from third party weather sources or from field stations located in proximity to the field being treated or the weather information may be communicated to the controller 200 via the monitor system 100.

The monitor system 100 is schematically illustrated in more detail in FIG. 2, and may include a monitor device 110, a communication module 120, and a display device 130. The monitor device 110 may include a graphical user interface (GUI) 112, memory 114, and a central processing unit (CPU) 116. The monitor device 110 is in electrical communication with the communication module 120 via a harness 150. The communication module 120 may include an authentication chip 122 and memory 126. The communication module 120 is in electrical communication with the display device 130 via a harness 152. The display device 130 may include a GUI 132, memory 134, a CPU 136 and a wireless Internet connection means 154 for connecting to a "cloud" based storage server 140. One such wireless Internet connection means 154 may comprise a cellular modem 138. Alternatively, the wireless Internet connection means 154 may comprise a wireless adapter 139 for establishing an Internet connection via a wireless router.

The display device 130 may be a consumer computing device or other multi-function computing device. The display device 130 may include general purpose software including an Internet browser. The display device 130 also may include a motion sensor 137, such as a gyroscope or accelerometer, and may use a signal generated by the motion sensor 137 to determine a desired modification of the GUI 132. The display device 130 may also include a digital camera 135 whereby pictures taken with the camera 135 may be associated with a global positioning system (GPS) position, stored in the memory 134 and transferred to the cloud storage server 140. The display device 130 may also include a GPS receiver 131.

Monitor System Operation

In operation, referring to FIG. 7, the monitor system 100 may carry out a process designated generally by reference numeral 1200. Referring to FIG. 7 in combination with FIG. 2, at step 1205, the communication module 120 performs an optional authentication routine in which the communication module 120 receives a first set of authentication data 190 from the monitor device 110 and the authentication chip 122 compares the authentication data 190 to a key, token or code stored in the memory 126 of the communication module 120 or which is transmitted from the display device 130. If the authentication data 190 is correct, the communication module 120 preferably transmits a second set of authentication data 191 to the display device 130 such that the display device 130 permits transfer of other data between the monitor device 110 and the display device 130 via the communication module 120 as indicated in FIG. 1.

At step 1210, the monitor device 110 accepts configuration input entered by the user via the GUI 112. In some embodiments, the GUI 112 may be omitted and configuration input may be entered by the user via the GUI 132 of the display device 130. The configuration input may comprise parameters preferably including dimensional offsets between the GPS receiver 166 and the spray nozzles 20 and the operating parameters of the sprayer 10 (e.g., nozzle type, nozzle spray pattern, orifice size, etc.). The monitor device 110 then transmits the resulting configuration data 188 to the display device 130 via the communication module 120 as indicated in FIG. 1.

At step 1212, the display device 130 may access prescription data files 186 from the cloud storage server 140. The prescription data files 186 may include a file (e.g., a shape file) containing geographic boundaries (e.g., a field boundary) and relating geographic locations (e.g., GPS coordinates) to operating parameters (e.g., product application rates). The display device 130 may allow the user to edit the prescription data file 186 using the GUI 132. The display device 130 may reconfigure the prescription data file 186 for use by the monitor device 110 and transmits resulting prescription data 185 to the monitor device 110 via the communication module 120.

At step 1214, as the sprayer implement 10 traverses the field, the monitor device 110 sends command signals 198 to the sprayer controller 200. These command signals 198 may include signals for controlling actuation of the pump, flow rate, line pressures, nozzle spray patterns, etc.

At step 1215, as the sprayer 10 traverses the field, the monitor device 110 receives raw as-applied data 181 including signals from the GPS receiver 166 and operating parameters from the sprayer controller 200. The monitor device 110 preferably processes the raw as-applied data 181, and stores the as-applied data to the memory 114. The monitor device 110 preferably transmits processed as-applied data 182 to the display device 130 via the communication module 120. The processed as-applied data 182 may be streaming, piecewise, or partial data.

At step 1220, the display device 130 receives and stores the live processed as-applied data 182 in the memory 134. At step 1225, the display device 130 renders a map of the processed as-applied data 182 (e.g., a spray rate map or droplet size map) as described more fully elsewhere herein. An interface 90 allows the user to select which map is currently displayed on the screen of the display device 130. The map may include a set of application map images superimposed on an aerial image. At step 1230, the display device 130 displays a numerical aggregation of as-applied data (e.g., spray rate by nozzle over the last 5 seconds). At step 1235, the display device 130 preferably stores the location, size and other display characteristics of the application map images rendered at step 1225 in the memory 134. At step 1238, after completing spraying operations, the display device 130 may transmit the processed as-applied data file 183 to the cloud storage server 140. The processed as-applied data file 183 may be a complete file (e.g., a data file). At step 1240 the monitor device 110 may store completed as-applied data (e.g., in a data file) in the memory 114.

Mapping and Display Methods

Figure 4:
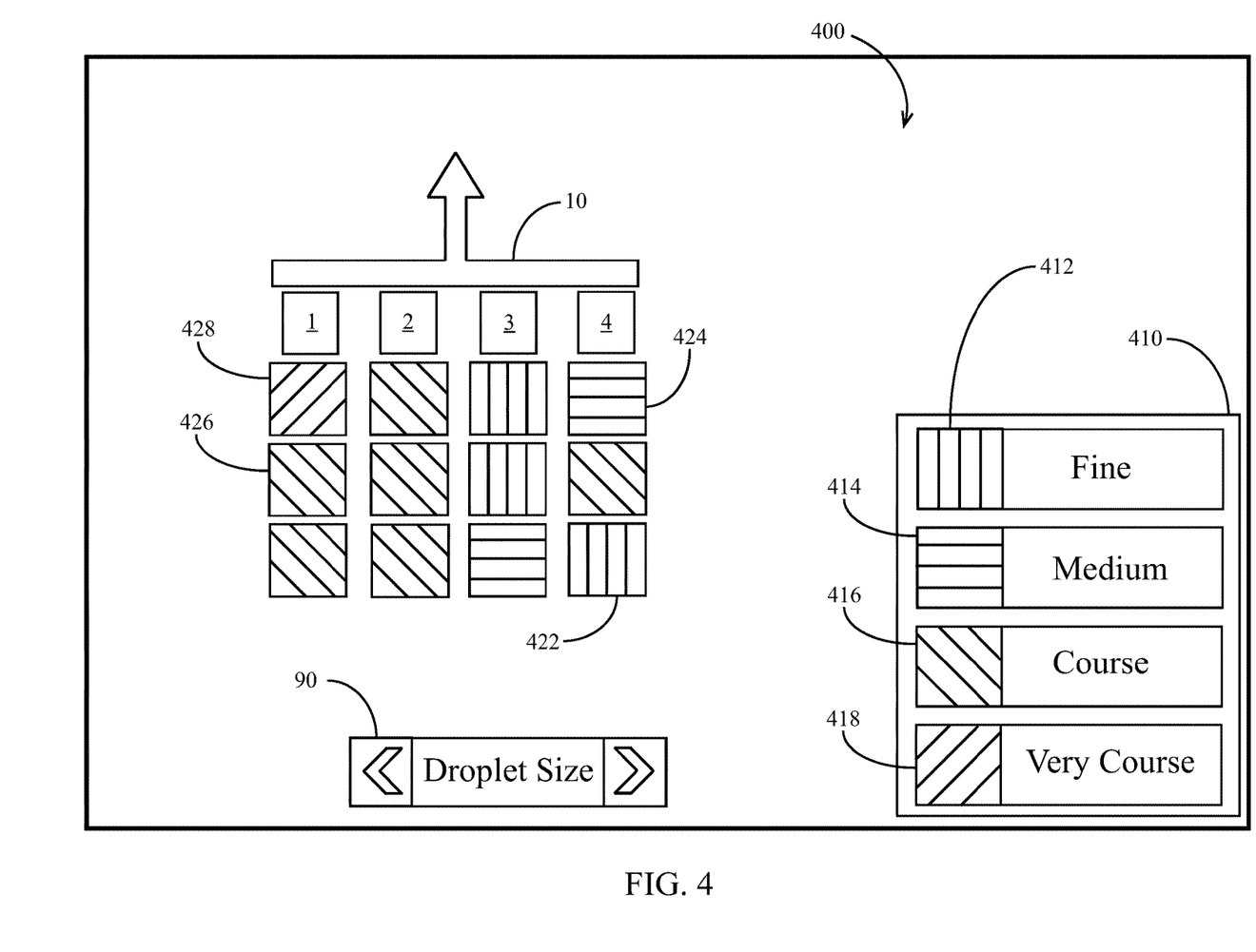

The monitor system 100 may display a droplet size map 400 as illustrated in FIG. 4. The product application rate map 400 may include a schematic representation of the location of the sprayer 10 and its transversely spaced nozzles 20 (e.g., spray nozzles 1-4). It should be appreciated that many more nozzles may be displayed on the rate map than the four nozzles as depicted in FIG. 4, which is provided for illustration purposes only. As the sprayer 10 traverses the field, a map block (e.g., map block 428) is placed in the location occupied by each spray nozzle 1-4. The pattern, symbol or color of each map block corresponds to a legend 410 preferably displayed in the droplet size map 400. The legend 410 preferably includes a set of legend ranges (e.g., legend ranges 412, 414, 416, 418) including, for example, a pattern, symbol or color and a corresponding to droplet size (typically measured in microns). It should be appreciated that the legend ranges 412, 414, 416, 418 correspond to map blocks 422, 424, 426, 428, respectively.

It should be appreciated, that the droplet size ranges may include more than the "Fine", "Medium", "Course", "Very Course" ranges depicted in FIG. 4. For example, established droplet size ranges are published by numerous sources which identify droplet size categories including "Extremely Fine", "Very Fine", "Fine", "Medium", "Course", "Very Course", "Extremely Course", and "Ultra Course", with each droplet size category having an established range of droplet sizes measured in microns.

Figure 3:
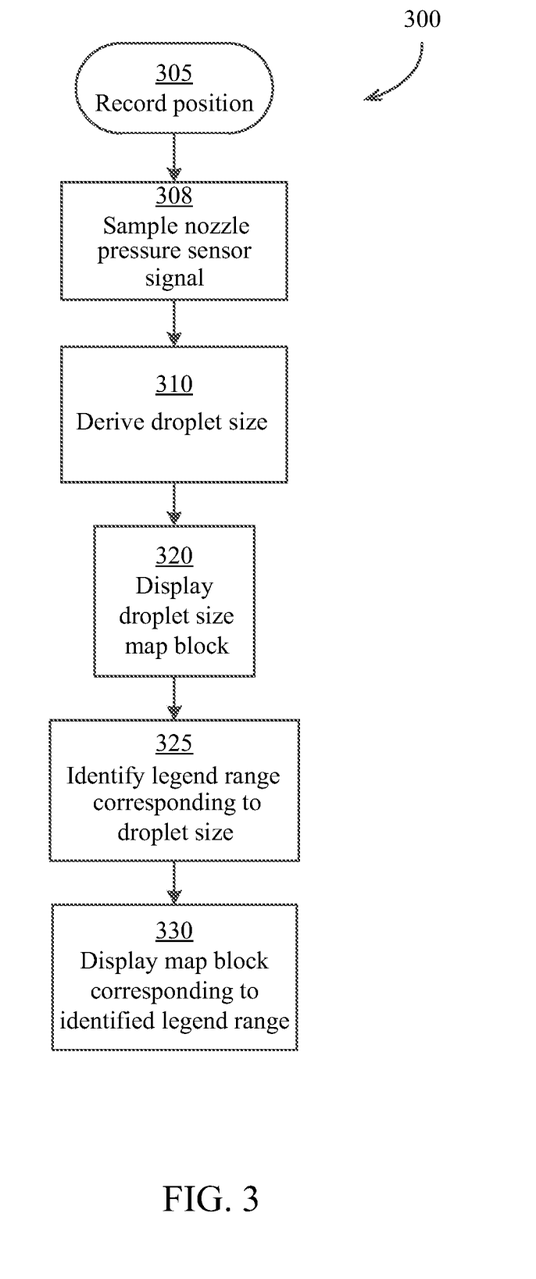

The monitor system 100 may display the product application rate map 400 according to a process designated generally by reference numeral 300 in FIG. 3. At step 305, the monitor device 110 records the position reported by the GPS receiver 166 and determines the position of each nozzle. At step 308, the monitor device 110 samples the pressure measured by the pressure sensor 162 at the nozzle or in the line associated with the nozzle. At step 310, the monitor device 110 uses the measured pressure sensor signal to derive the droplet size, using algorithms or lookup tables. The algorithms required to calculate droplet size and tables or graphs that identify droplet size for various nozzles at various pressures are well known and thus are not reproduced herein.

At step 325 the display device 130 preferably identifies the legend range corresponding to the derived droplet size (e.g., if the droplet size falls within the "Course" category, the display identifies legend range 416). At step 330, the display device 130 displays a map block corresponding to the identified droplet size (e.g., if the droplet size corresponding to 416 is identified, map block 426 is displayed).

Figures 1, 1A:
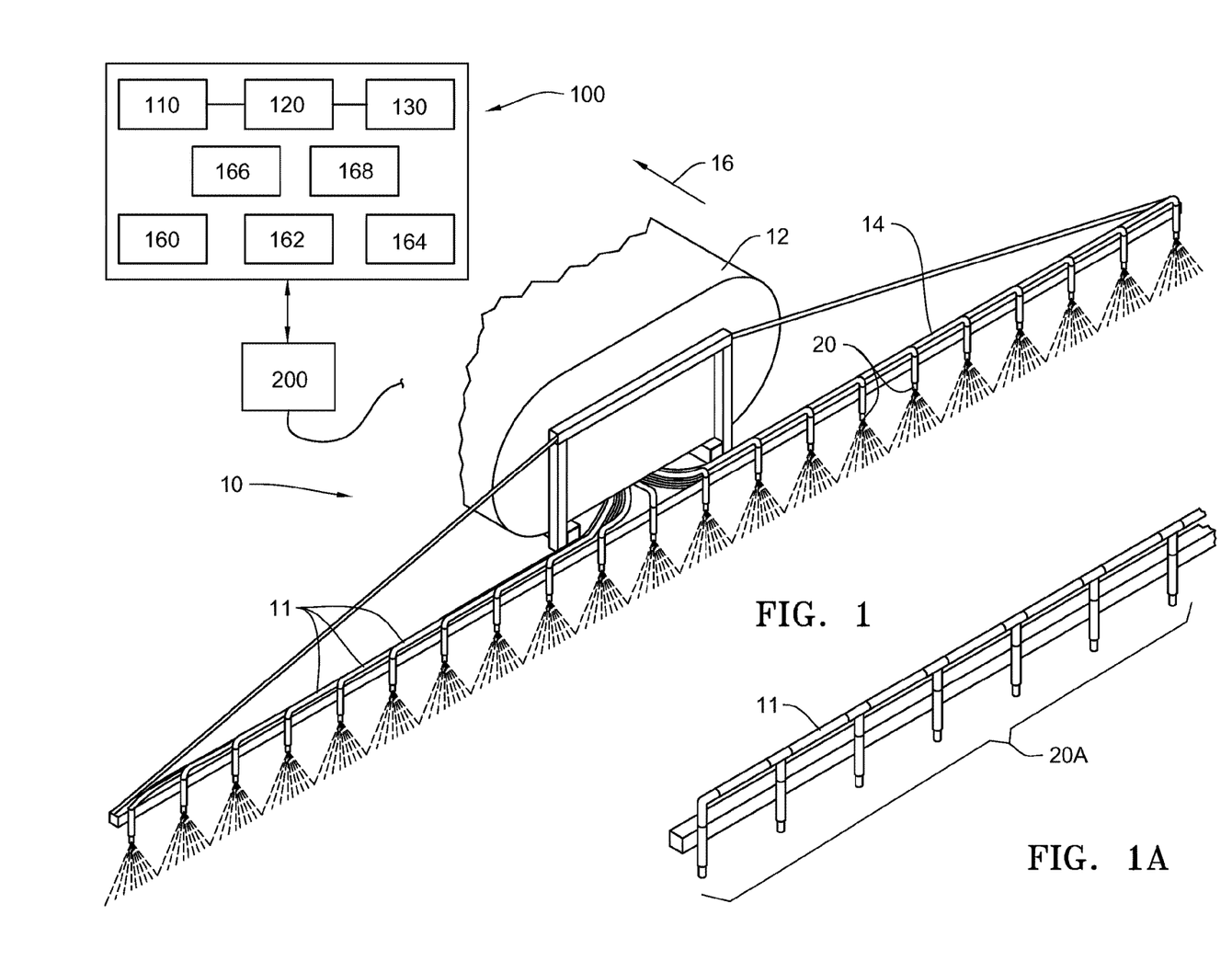
Figure 2:
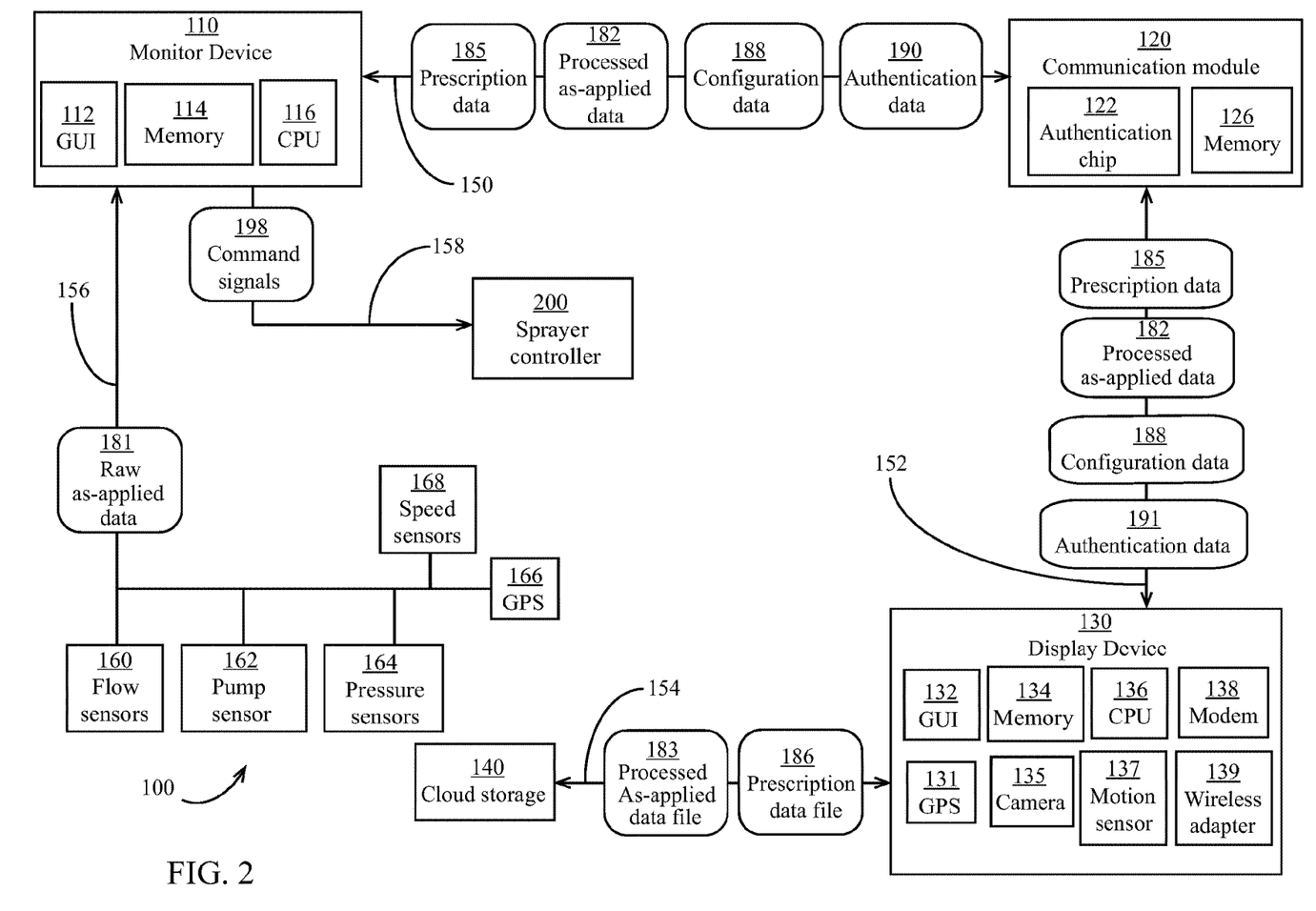

In another embodiment, instead of mapping droplet size 400 for each nozzle 20, droplet size 400 may be mapped for a section of nozzles 20, such as when a pressure sensor 162 is associated with a gang of nozzles 20A as shown in FIG. 1A. In such an embodiment, one line or hose 11 may supply a plurality of nozzles 20 comprising the gang of nozzles 20A all connected to a pressure sensor 162. Alternatively, a plurality of pressure sensors 162 may be averaged together to have a pressure and a resulting droplet size for a gang of nozzles 20A.

Figure 5:
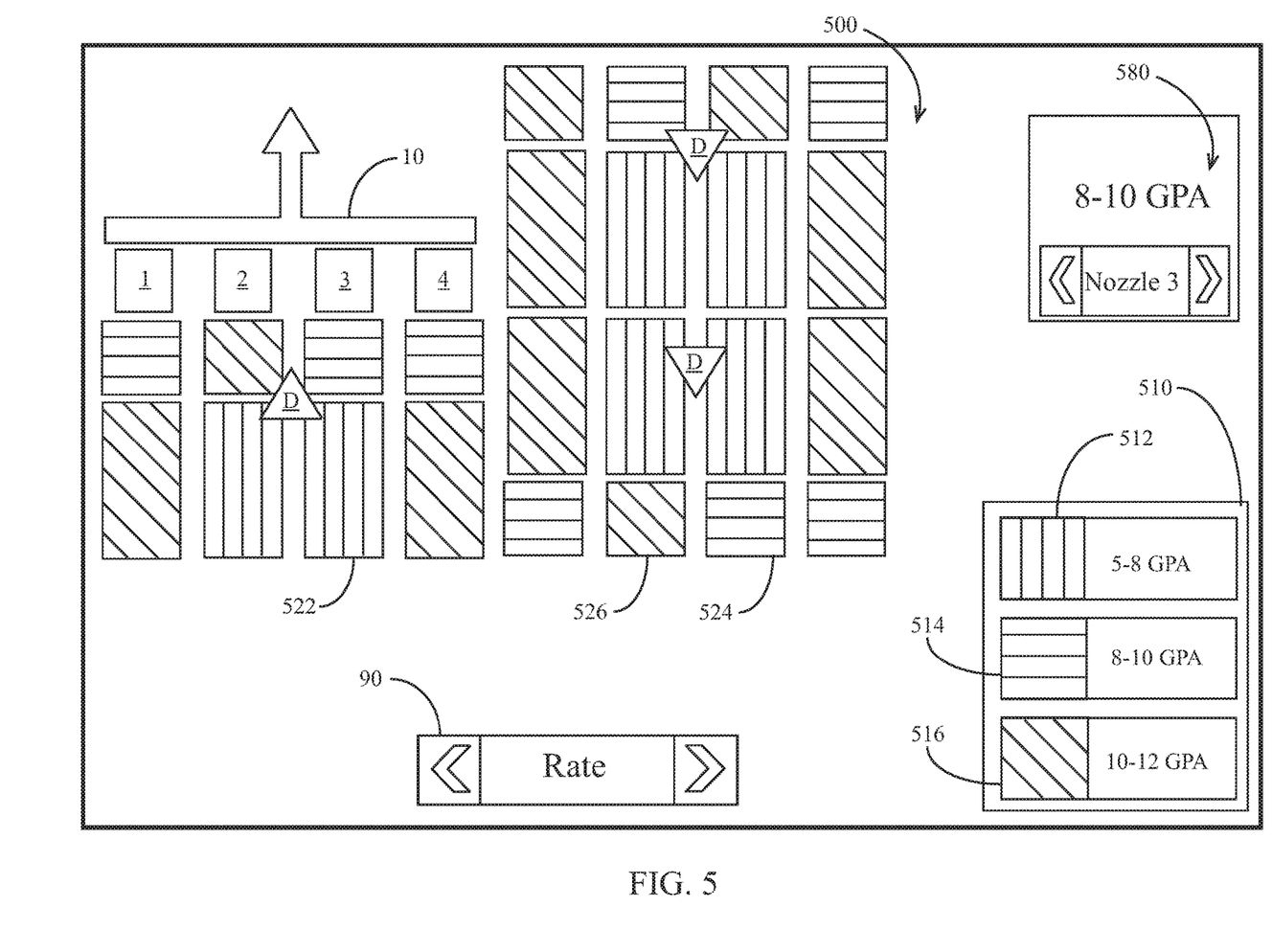

The monitor system 100 may also display a product application rate map 500 an embodiment of which is illustrated in FIG. 5. The product application rate map 500 preferably includes a schematic representation of the location of the sprayer 10 and its transversely-spaced nozzles 20 (e.g., nozzles 1-4). It should be appreciated that many more nozzles may be displayed on the droplet size map than the four nozzles as depicted in FIG. 5, which is provided for illustration purposes only. As the sprayer 10 traverses the field, a map block (e.g., map block 522) is placed in the location occupied by each nozzle 1-4. The pattern, symbol or color of each map block corresponds to a legend 510 preferably displayed in the application rate map 500. The legend 510 preferably includes a set of legend ranges (e.g., legend ranges 512, 514, 516) including a pattern, symbol or color and a corresponding application rate range. It should be appreciated, that the application rate ranges may include more than the three ranges depicted in FIG. 5, which are provided for illustration purposes only. The legend ranges 512, 514, 516 correspond to application rates as discussed below. It should be appreciated that the legend ranges 512, 514, 516 correspond to map blocks 522, 524, 526, respectively. The application rate map 500 may include an aggregate interface 580 displaying the aggregate application rate (e.g., the application rate over the last 5 seconds) by nozzle and may allow the user to select the nozzle (e.g., nozzle 3 in FIG. 5) for which the aggregate application rate is displayed. The application rate map 500 may display multiple direction images "D" indicating the direction of the sprayer 10. The direction images D may be superimposed over or adjacent to one or more map blocks (e.g., map block 522) and indicate the direction of the sprayer 10 at the time the superimposed or adjacent map blocks were placed.

Figure 6:
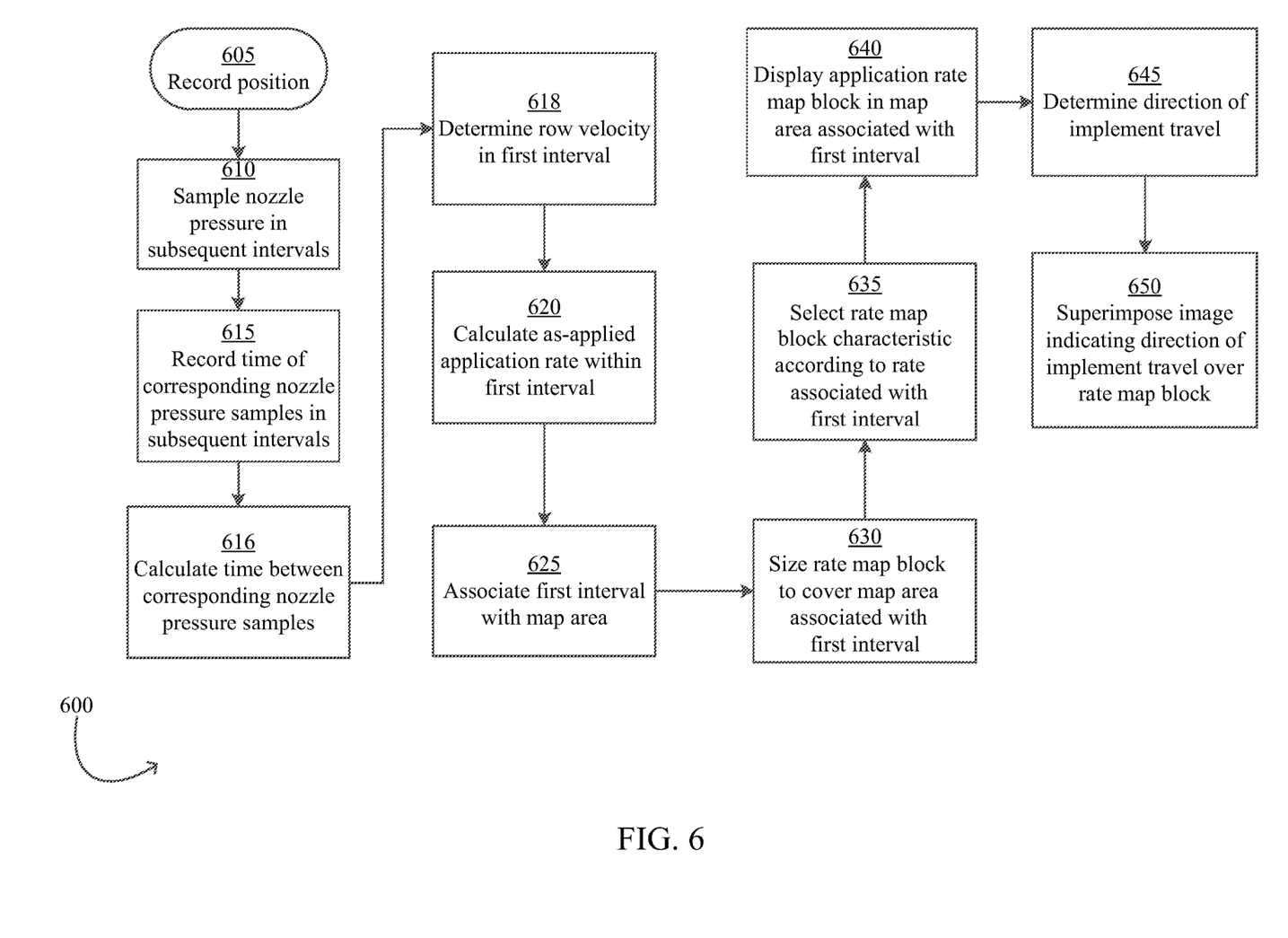
Figure 7:
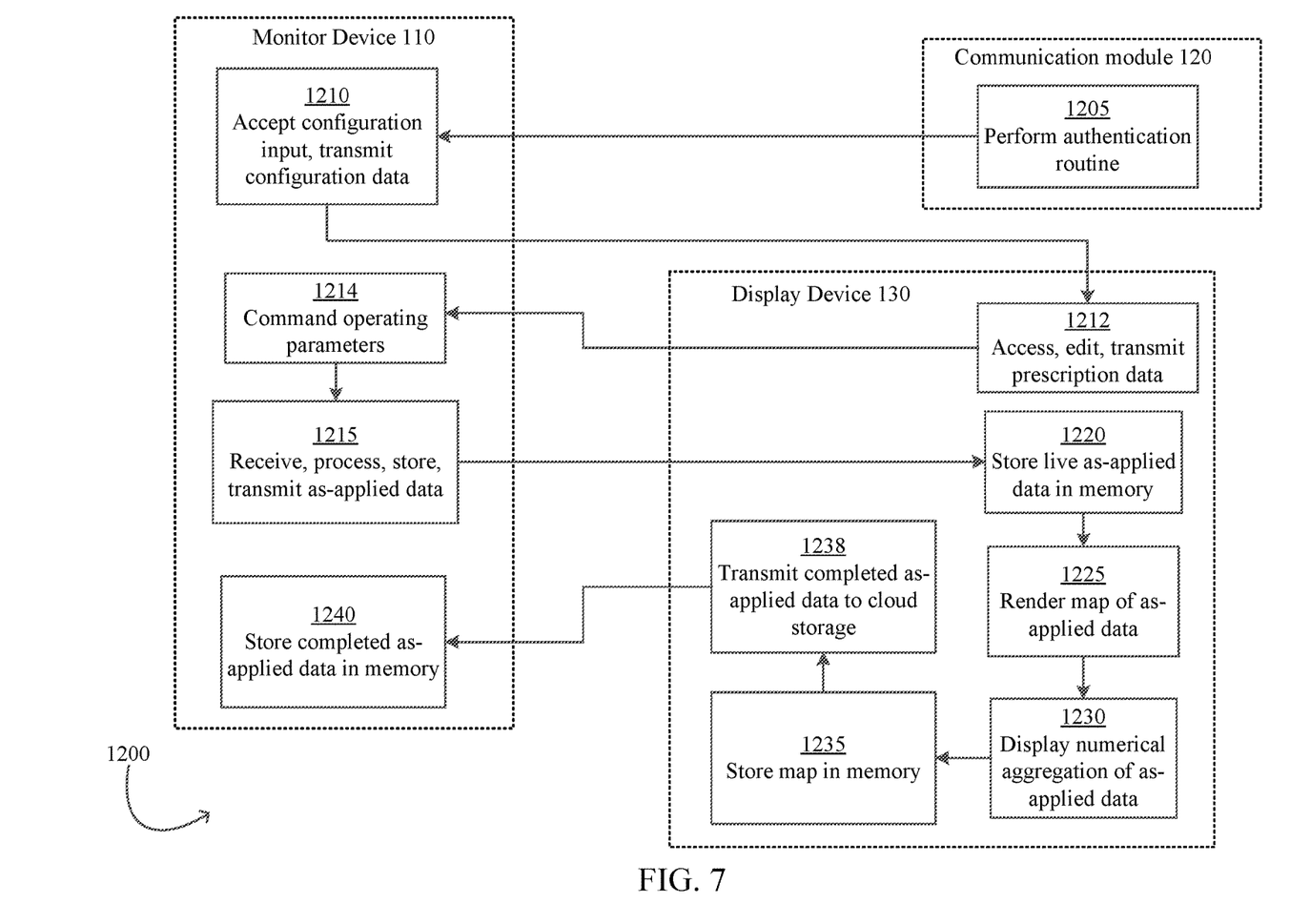

The monitor system 100 may display the application rate map 500 according to an embodiment of a process designated generally by reference numeral 600 in FIG. 6. At step 605, the monitor device 110 records the position reported by the GPS receiver 166 and determines the position of each nozzle 20. At step 610, the monitor device 110 samples the pressure measured by the pressure sensor 162 at the nozzle or in the line associated with the nozzle at regular intervals (e.g., one-second intervals). At step 615, the monitor device 110 preferably stores the time of corresponding pressure samples. At step 618, the monitor device 110 preferably determines the nozzle velocity of each nozzle during the first interval (e.g., by averaging all nozzle velocity measurements during the first interval). In some embodiments, the monitor device 110 assumes the velocity of each nozzle is equal to the speed along the direction of travel reported by a speed sensor 168 mounted to the sprayer 10. In other embodiments, the monitor device 110 calculates a nozzle-specific velocity more accurately (e.g., when executing turns) using one or more speed sensors 168 mounted to the boom 14. At step 620, the monitor device 110 derives the as-applied application rate. The product application rate may be derived, using algorithms or lookup tables. The algorithms required to calculate application rates and tables or graphs that identify application rates for various nozzles at various pressures and speeds are well known and thus are not reproduced herein.

Continuing to refer to FIG. 6, at step 625 the display device 130 preferably associates the first interval with a map area (e.g., using one or more positions reported by the GPS receiver 166 during the first interval). At step 630, the display device 130 preferably determines the application rate map block to cover the map area associated with the first interval (e.g., a rectangle having a length corresponding to the positions reported by the GPS receiver 166 at the beginning and end of the first interval, and having a width equal to the nozzle spacing). Thus it should be appreciated that for each nozzle, each interval is associated with a map block.

With reference to FIG. 5, it should be appreciated that the length of the application rate map blocks may vary depending on the nozzle velocity during each interval. At step 635, the display device 130 preferably selects an application rate image characteristic (e.g., a pattern, symbol or color) based on the legend range in legend 510 associated with the application rate calculated for the first interval (e.g., application rate map block 522 has a calculated application rate of 5 to 8 gallons per acre and thus has a pattern corresponding to legend range 512). At step 640, the display device 130 preferably displays the application rate map block in the map area associated with the first interval. At step 645, the display device 130 determines the direction of implement travel during the first interval (e.g., by determining the direction of a line between the position during the first interval and the position during a prior interval). At step 650 the display device 130 may display an image (e.g., direction images D in FIG. 5) indicating the direction of travel. Each direction image may be superimposed over one or more application rate map blocks associated with the first interval. It should be appreciated that the direction images D assist the user in determining which nozzle sprayed an area when reviewing the map after spraying operations.

Linked Mapping Methods

Figure 12:
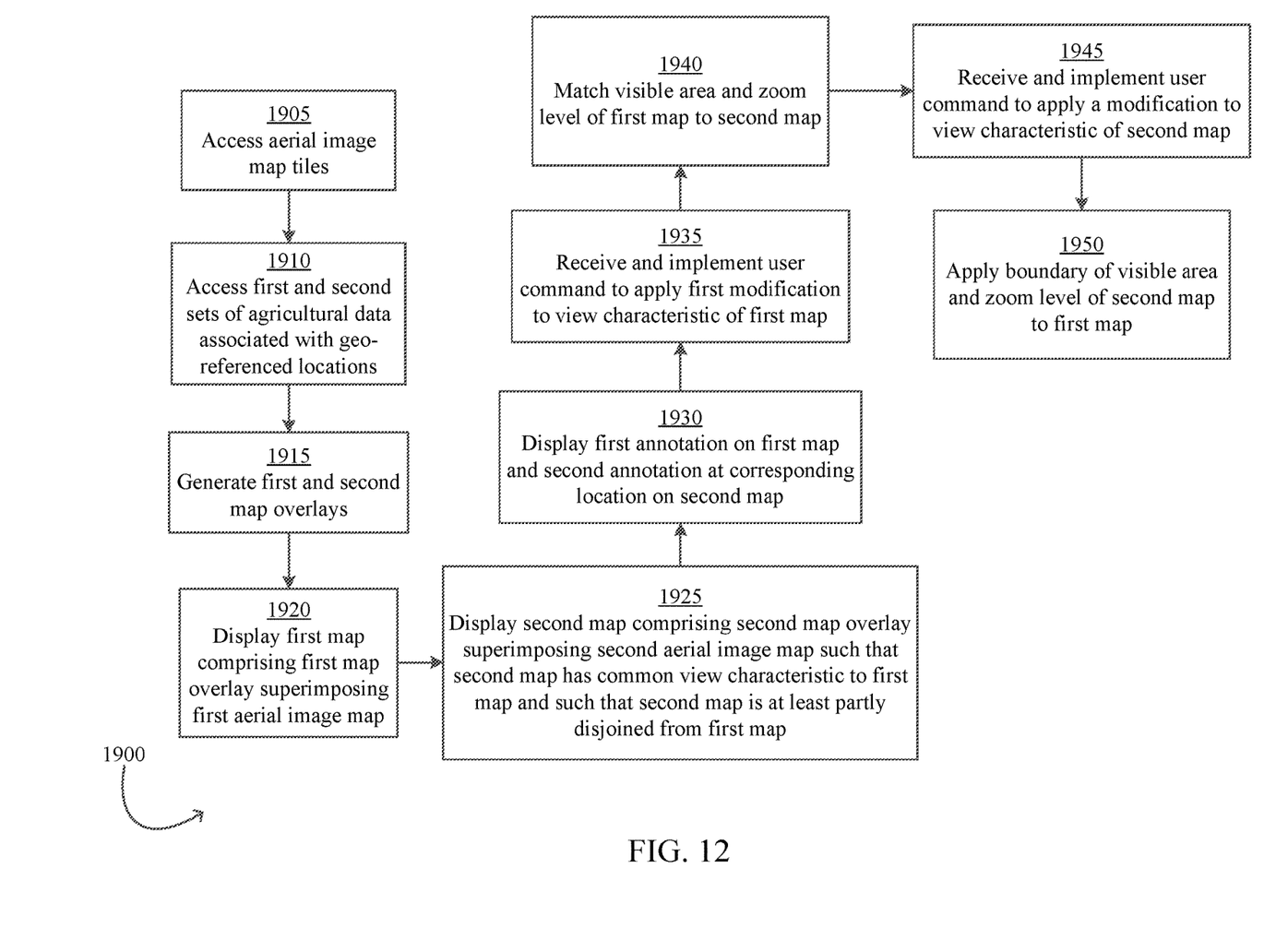

A process for displaying linked maps of agricultural data is illustrated generally by reference numeral 1900 in FIG. 12. At step 1905, the display device 130 preferably accesses aerial image map tiles corresponding to a location. At step 1910, the display device 130 preferably accesses first and second sets of agricultural data. Each set of agricultural data preferably comprises agricultural data associated with geo-referenced locations such that a spatial map may be generated therefrom. At step 1915, the display device 130 preferably generates a first map overlay corresponding to the first set of agricultural data and a second map overlay corresponding to the second set of agricultural data. At step 1920 the display device 130 preferably displays a first map comprising the first map overlay, preferably superimposed over a first aerial image map. At step 1925 the display device 130 preferably displays a second map comprising the second map overlay, preferably superimposed over a second aerial image map. The second map preferably has a view characteristic (e.g., orientation, scale, zoom level or center) equal to the same view characteristic of the first map. The second map preferably has multiple view characteristics equal to the same view characteristics of the first map. The second map is preferably at least partly disjoined from the first map (e.g., the second map may be displayed side-by-side with the first map). At step 1930, the display device 130 preferably displays a first annotation on the first map and a second annotation on the second map. Both the first annotation and second annotation preferably correspond to the same geo-referenced location such that a user may reference the annotation to visually determine corresponding locations on the first and second maps.

Continuing to refer to the process 1900, at step 1935 the display device 130 preferably receives and implements a user command to apply a first modification to a view characteristic of the first map. In some embodiments the user command comprises a manipulation of a user interface displayed on the map (e.g., adjustment of a scale to adjust zoom level). In other embodiments the user command comprises a manipulation of a touch screen of the display (e.g., "pinching" the touch screen to adjust zoom level). At step 1940, upon determining that a modification has been made to the first map, the display device 130 preferably matches the visible area and zoom level of the second map to the visible area and zoom level of the first map. The display device 130 preferably matches the visible area of the second map to the visible area the first map by determining the geo-referenced locations corresponding to a boundary of the first map and then re-drawing the second map such that a boundary of the second map corresponds to the same geo-referenced locations.

In an alternative embodiment of step 1940, the display device 130 applies a second modification to the second map corresponding to the first modification and preferably applies the second modification to the same view characteristic as the first modification. For example, if the first modification comprises rotation of the first map about a first angle, then the second modification preferably comprises rotation of the second map about the first angle.

At step 1945, the display device 130 preferably receives and implements a user command to apply a modification to a view characteristic of the second map. At step 1950, upon determining that a modification has been made to the second map, the display device 130 preferably matches the visible area and zoom level of the first map to the visible area and zoom level of the second map.

Figure 8:
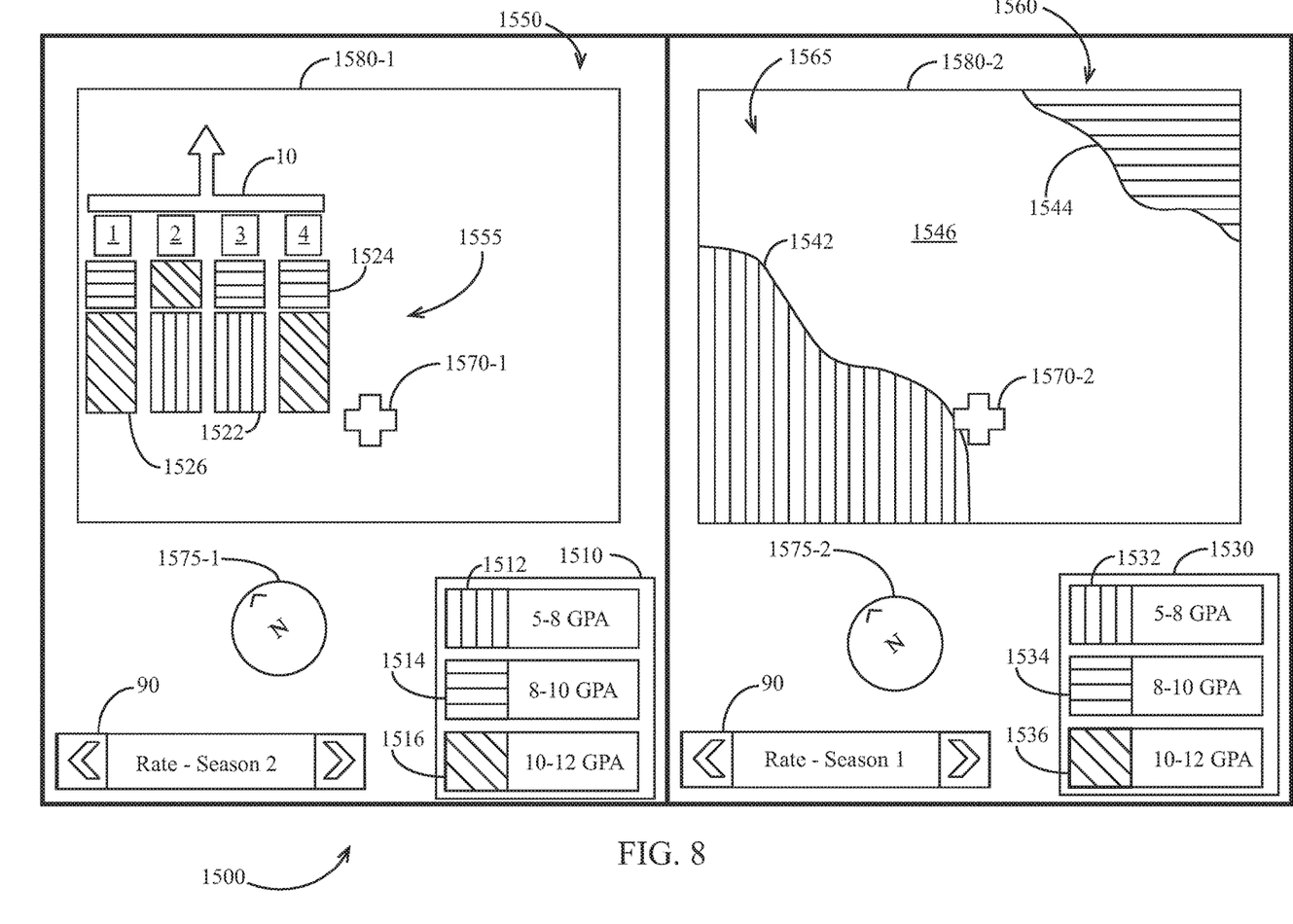

Turning to FIG. 8, a first implementation of the process 1900 is illustrated in a map screen 1500. The map screen 1500 preferably includes a live spraying map window 1550 and a prior season spraying map window 1560. The live spraying map window 1550 preferably displays a map overlay 1555 comprised of map blocks 1522, 1524, 1526 representing live spraying data (e.g., application rate) associated with the location of the block. As the sprayer traverses the field, an annotation indicating the location of the sprayer 10 as it traverses the field and a map block (e.g., map block 1524) is placed in the location occupied on the map screen 1500 by each nozzle 1-4. The pattern, symbol or color of each map block corresponds to a legend 1510 preferably displayed in the live spraying map window 1550. The legend 1510 preferably includes a set of legend ranges (e.g., legend ranges 1512, 1514, 1516) including a pattern, symbol or color and a corresponding value range. The legend ranges 1512, 1514, 1516 correspond to application rate ranges. It should be appreciated that the legend ranges 1512, 1514, 1516 correspond to map blocks 1522, 1524, 1526, respectively. A boundary 1580-1 preferably defines the extent of the map being displayed. The boundary 1580-1 preferably remains in the same position with respect to the borders of the live spraying map window 1550. In some embodiments, the boundary 1580-1 is coextensive with the borders of the live spraying map window 1550. An orientation indicator 1575-1 preferably indicates the current orientation of the map layer 1555. When the map layer 1555 is rotated, the orientation indicator 1575-1 preferably updates to display the orientation of the map layer with respect to north. An annotation 1570-1 preferably remains at the same position with respect to the boundary 1580-1 as the map layer 1555 is manipulated.

Continuing to refer to FIG. 8, the prior season spray map window 1560 preferably displays a prior season spraying data map overlay 1565 comprised of map polygons 1542, 1544, 1546 representing spraying data (e.g., application rates) from a prior season. The pattern, symbol or color of each map polygon corresponds to a legend 1530 preferably displayed in the prior season spray map window 1560. The legend 1530 preferably includes a set of legend ranges (e.g., legend ranges 1532, 1534, 1536) including a pattern, symbol or color and a corresponding value range. The legend ranges 1512, 1514, 1516 correspond to application ranges. It should be appreciated that the legend ranges 1532, 1534, 1536 correspond to map blocks 1542, 1544, 1546, respectively. A boundary 1580-2 preferably defines the extent of the map being displayed. The boundary 1580-2 preferably remains in the same position with respect to the borders of the live spraying map window 1550. In some embodiments the boundary 1580-2 is coextensive with the borders of the live spraying map window 1550. The boundaries 1580-1, 1580-2 preferably correspond to the same set of geo-referenced coordinates. An orientation indicator 1575-2 preferably indicates the current orientation of the map layer 1565. When the map layer 1565 is rotated, the orientation indicator 1575-2 preferably updates to display the orientation of the map layer with respect to north. An annotation 1570-2 preferably remains at the same position with respect to the boundary 1580-2 as the map layer 1565 is manipulated. The annotations 1570-1,1570-2 preferably correspond to the same geo-referenced location (e.g., the same GPS coordinates) such that a user may use the annotations as a point of reference to compare corresponding locations on the map layers 1555, 1565.

Figure 9:
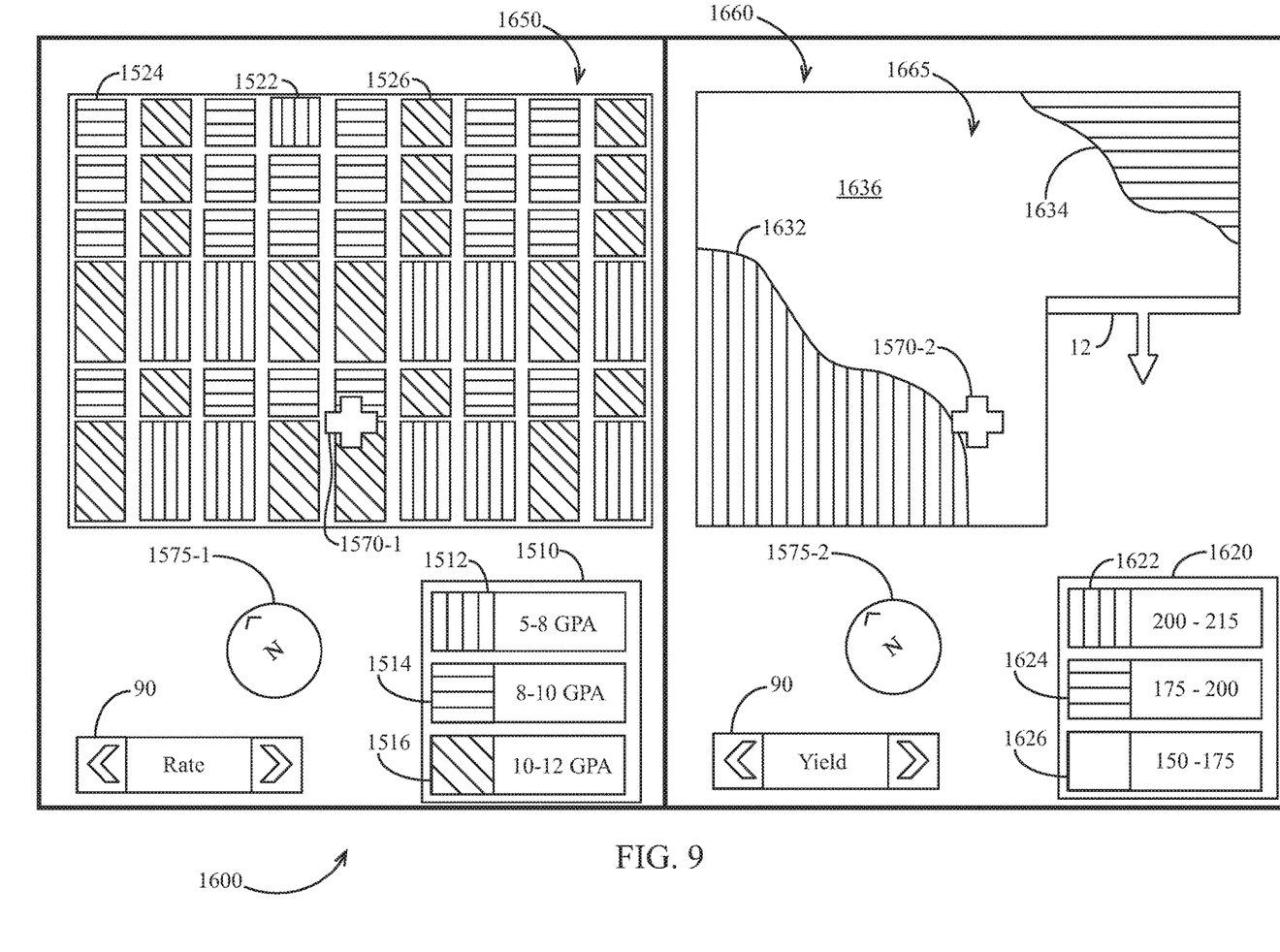

Turning to FIG. 9, a second implementation of the process 1900 is illustrated in a map screen 1600. The map screen 1600 preferably includes a completed spray map window 1650 and a live yield map window 1660. The completed spray map window 1650 is preferably similar to the live spray map window of FIG. 8, except that the data has been completed in a prior spraying operation and is obtained from a file stored in memory. The live yield map window 1660 preferably includes a map layer 1665 comprising yield map polygons 1632, 1634, 1636 (or blocks similar to those used in the spray maps described herein) corresponding to ranges 1622, 1624, 1626 of a yield legend 1620. As the combine traverses the field, a combine annotation 12 indicates the current location of the combine within the map.

Figure 10:
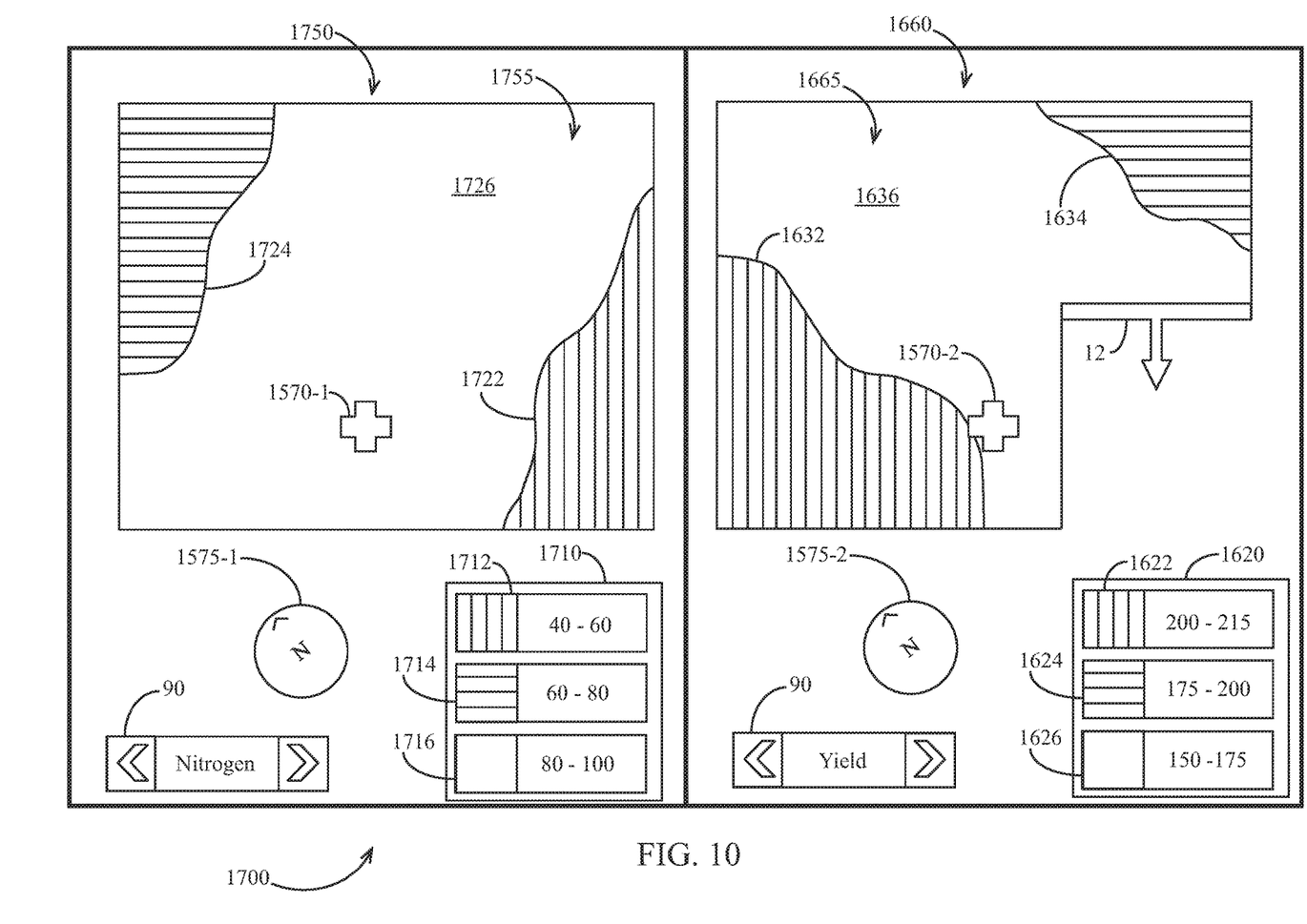

Turning to FIG. 10, a third implementation of the process 1900 is illustrated in a map screen 1700. The map screen 1700 preferably includes an input application window 1750 and a live yield map window 1660 substantially similar to the live yield map window 1660 in the map screen 1600 of FIG. 9. The input application window 1750 preferably displays a map layer 1755 representing spatially varying rate of application of a crop input; in the illustrated embodiment, the map layer 1755 represents the rate of application of nitrogen. The map layer 1755 preferably comprises a set of application rate polygons 1722, 1724, 1726 corresponding to legend ranges 1712, 1714, 1716 of an application rate legend 1710. The data used to generate the map layer 1755 may be accessed from a memory outside the monitor system 100. For example, nitrogen application rate data may be transferred (e.g., via a portable memory) from a desktop computer used to generate a nitrogen application prescription or a nitrogen application monitor system used to control and record as-applied nitrogen application.

Figure 11:
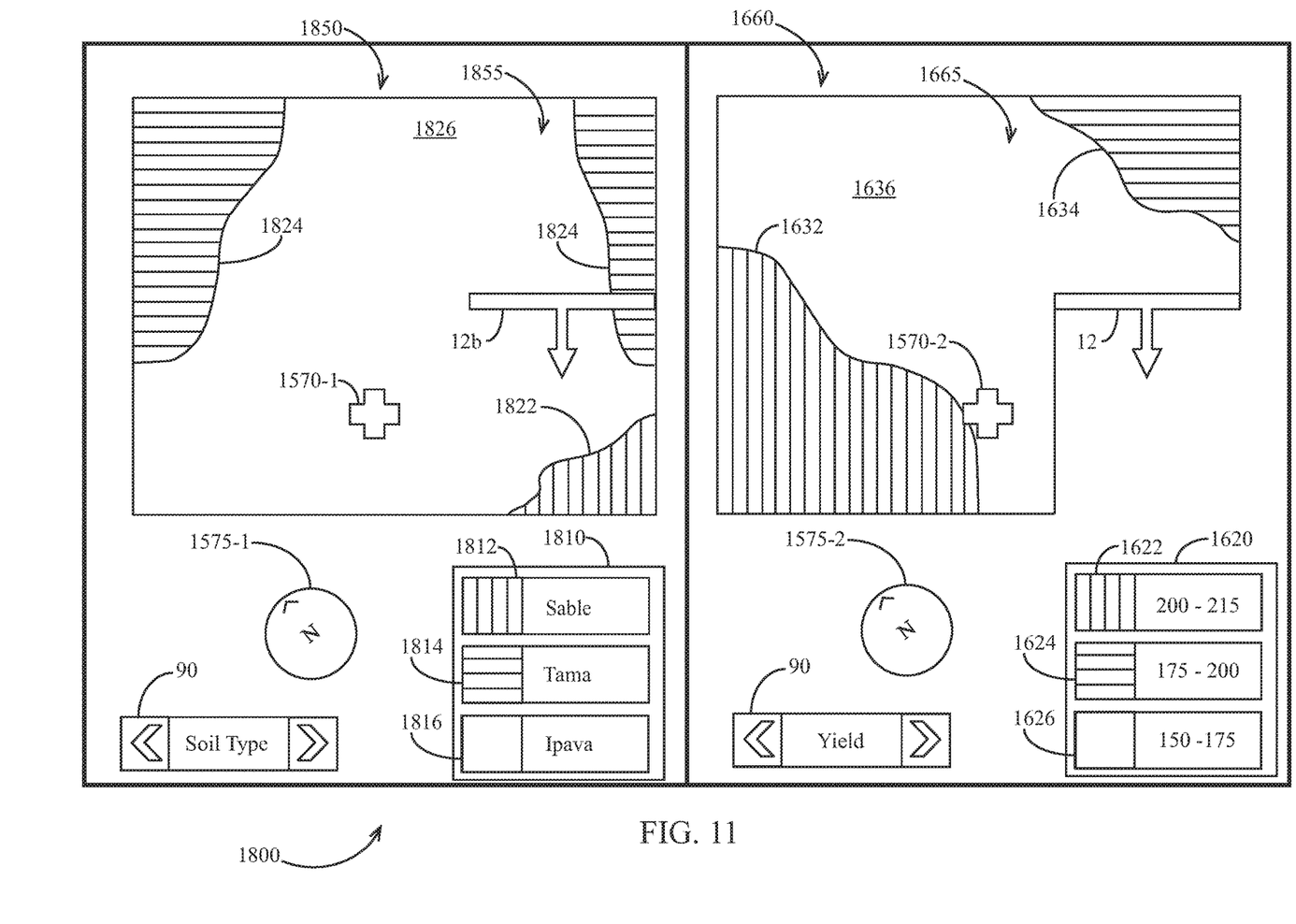

Turning to FIG. 11, a fourth implementation of the process 1900 is illustrated in a map screen 1800. The map screen 1800 preferably includes a soil type window 1850 and a live yield map window 1660 substantially similar to the live yield map window 1660 in the map screen 1600 of FIG. 9. The soil type window 1850 preferably displays a map layer 1855 representing spatially soil types in the field. The map layer 1855 preferably comprises a set of soil type polygons 1822, 1824, 1826 corresponding to legend ranges 1812, 1814, 1816 of an soil type legend 1810. A combine annotation 12*b* is preferably displayed in the soil type window 1850; as the combine traverses the field, the display device 130 preferably updates the location of the combine annotation 12*b* such that the combine annotation 12*b* is displayed at the location on the map layer 1855 corresponding to the same geo-referenced location as the current location of the combine annotation 12 on the map layer 1665.

Components described herein as being in electrical communication may be in data communication via any suitable device or devices. The term "data communication" as used herein is intended to encompass wireless (e.g., radio-based), electrical, electronic, and other forms of digital or analog data transmission. Components described herein as being in communication via a harness may be in data communication via any suitable device or devices. A harness may comprise a single electrical line or a bundled plurality of electrical lines, and may comprise a point-to-point connection or a bus.

The foregoing description and drawings are intended to be illustrative and not restrictive. Various modifications to the embodiments and to the general principles and features of the system and methods described herein will be apparent to those of skill in the art. Thus, the disclosure should be accorded the widest scope consistent with the appended claims and the full scope of the equivalents to which such claims are entitled.

The invention claimed is:

1. A method of graphically mapping liquid product applied to a field by an agricultural sprayer having a plurality of spray nozzles or a gang of the plurality of spray nozzles, the method comprising:
    monitoring geographic locations of each of the plurality of spray nozzles or the gang of the plurality of spray nozzles as the agricultural sprayer traverses the field;
    measuring the pressure at regular time intervals at each of the plurality of spay nozzles or the gang of the plurality of spray nozzles as the agricultural sprayer traverses the field;
    deriving a droplet size of the liquid product sprayed by each of the plurality of spray nozzles or the gang of the plurality of spray nozzles based on said measured pressure and predefined nozzle characteristics of each of said plurality of spray nozzles or the gang of the plurality of spray nozzles;
    generating an application map on an aerial image of the field, the application map including a droplet size map displaying said droplet sizes being sprayed by each of the plurality of spray nozzles or the gang of the plurality of spray nozzles as the agricultural sprayer traverses the field.

2. The method of claim 1, wherein said as-applied application map includes a schematic representation of a location of the agricultural sprayer and the plurality of spray nozzles or the gang of the plurality of spray nozzles as the agricultural sprayer traverses the field.

3. The method of claim 2, wherein said droplet size map includes a droplet map block placed in a location occupied by each of said plurality of spray nozzles or the gang of the plurality of spray nozzles as the agricultural sprayer traverses the field.

4. The method of claim 3, wherein each said droplet map block corresponds to a droplet size range.

5. The method of claim 4, wherein each said droplet size range is represented by a pattern, symbol or color.

6. The method of claim 5, wherein said droplet size map includes a legend associating each said pattern, symbol or color with each said droplet size range.

7. The method of claim 1, further comprising:
  determining a nozzle velocity of each nozzle of the plurality of spray nozzles or the gang of the plurality of spray nozzles;
  deriving an application rate of the liquid product sprayed by each of the plurality of spray nozzles or said gang of spray nozzles based on said measured pressure and said nozzle velocity;
  wherein said application map includes an application rate map displaying said application rates being sprayed by each of the plurality of spray nozzles or said gang of spray nozzles as the agricultural sprayer traverses the field.

8. The method of claim 7, wherein said step of determining nozzle velocity is based on a measured speed of the agricultural sprayer.

9. The method of claim 7, wherein said step of determining nozzle velocity is determined using speed sensors mounted to the sprayer.

10. The method of claim 7, wherein said application rate map includes a schematic representation of a location of the agricultural sprayer and the plurality of nozzles or the gang of the plurality of spray nozzles as the agricultural sprayer traverses the field.

11. The method of claim 10, wherein said application rate map includes an application rate map block placed in a location occupied by each of the plurality of spray nozzles or the gang of the plurality of spray nozzles as the agricultural sprayer traverses the field.

12. The method of claim 11, wherein each said application rate map block corresponds to an application rate range.

13. The method of claim 12, wherein each said application rate range is represented by a pattern, symbol or color.

14. The method of claim 13, wherein said application rate map includes a legend associating each said pattern, symbol or color with each said application rate range.

15. The method of claim 1, wherein the spray nozzles of the plurality of spray nozzles or the gang of the plurality of spray nozzles are configured with actuators enabling selection of different nozzle droplet sizes.

* * * * *